United States Patent
Ridgill, II et al.

(10) Patent No.: US 11,681,879 B2
(45) Date of Patent: Jun. 20, 2023

(54) MASKING PERSONAL TRAITS IN ANONYMOUS FEEDBACK

(71) Applicant: INTERNATIONAL BUSINESS MACHINES CORPORATION, Armonk, NY (US)

(72) Inventors: Stephen Paul Ridgill, II, Raleigh, NC (US); Aditya Mandhare, Durham, NC (US); Randy A. Rendahl, Raleigh, NC (US); Zach Taylor, Fuquay Varina, NC (US)

(73) Assignee: International Business Machines Corporation, Armonk, NY (US)

(*) Notice: Subject to any disclaimer, the term of this patent is extended or adjusted under 35 U.S.C. 154(b) by 223 days.

(21) Appl. No.: 17/156,760

(22) Filed: Jan. 25, 2021

(65) Prior Publication Data
US 2022/0237390 A1    Jul. 28, 2022

(51) Int. Cl.
G06F 40/56    (2020.01)
G06F 40/51    (2020.01)
G06F 21/62    (2013.01)
G06F 40/30    (2020.01)

(52) U.S. Cl.
CPC .......... G06F 40/56 (2020.01); G06F 21/6254 (2013.01); G06F 40/30 (2020.01); G06F 40/51 (2020.01)

(58) Field of Classification Search
CPC ...... G06F 40/56; G06F 21/6254; G06F 40/30; G06F 40/51; G06F 21/45
See application file for complete search history.

(56) References Cited

U.S. PATENT DOCUMENTS

| | | | |
|---|---|---|---|
| 8,515,755 B2 | 8/2013 | Schubert | |
| 10,360,407 B2 | 7/2019 | Gordon | |
| 2012/0266250 A1* | 10/2012 | Uhl | G06F 21/6254 726/26 |
| 2014/0280261 A1 | 9/2014 | Butler | |
| 2017/0250959 A1* | 8/2017 | Gordon | G06N 20/00 |

(Continued)

OTHER PUBLICATIONS

Prabhumoye, S., Tsvetkov, Y., Salakhutdinov, R., & Black, A.W. (2018). Style Transfer Through Back-Translation. ACL. (Year: 2018).*

(Continued)

*Primary Examiner* — Bhavesh M Mehta
*Assistant Examiner* — Philip H Lam
(74) *Attorney, Agent, or Firm* — Kristofer L. Haggerty (57) ABSTRACT

A method, computer system, and a computer program product for masking identifying traits contained in response text is provided. Embodiments may include receiving a request to anonymize response text in response to a predefined respondent interaction, wherein the response text is generated by the respondent and then obtaining the response text, wherein the obtained response text has semantic characteristics. Next, the obtained response text may be input into a natural language processing (NLP) algorithm and thereafter receiving an alternative masking text as output from the NLP algorithm, wherein the received alternative masking text maintains the semantic characteristics of the obtained response text. Finally, the response text may be replaced with the received alternative masking text.

20 Claims, 5 Drawing Sheets

(56) References Cited

U.S. PATENT DOCUMENTS

2022/0036153 A1* 2/2022 O'Malia .............. G06N 3/0454

OTHER PUBLICATIONS

Nguyen-Son et al., "Anonymizing Personal Text Messages Posted in Online Social Networks and Detecting Disclosures of Personal Information," IEICE Trans. Inf. & Syst., vol. E98-D, No. 1 Jan. 2015, pp. 78-88.

Dey et al., "A Paraphrase and Semantic Similarity Detection System for User Generated Short-Text Content on Microblogs," Proceedings of COLING 2016, the 26th International Conference on Computational Linguistics: Technical Papers, pp. 2880-2890, Osaka, Japan, Dec. 11-17, 2016.

Disclosed Anonymously, "Social Media Anonymizer," IP.com No. IPCOM000248504D, Publication Date: Dec. 9, 2016, 3 pages.

Google, "De-identifying sensitive data," https://cloud.google.com/dlp/docs/deidentify-sensitive-data#api_overview, accessed Sep. 9, 2020, 25 pages.

Heaven, "OpenAI's new language generator GPT-3 is shockingly good—and completely mindless," MIT Technology Review, Jul. 20, 2020, https://www.technologyreview.com/2020/07/20/1005454/openai-machine-learning-language-generator-gpt-3-nlp/, accessed Sep. 25, 2020, 9 pages.

Mell et al., "The NIST Definition of Cloud Computing", National Institute of Standards and Technology, Special Publication 800-145, Sep. 2011, 7 pages.

Nguyen, "Anonymizing Private Phrases and Detecting Disclosure in Online Social Networks," SOKENDAI Repository (The Graduate University for Advanced Studies, https://ir.soken.ac.jp/?action=pages_view_main&active_action=repository_view_main_item_detail&item_id=5290&item_no=1&page_id=24&block_id=94, accessed Sep. 25, 2020, 8 pages.

Prabhumoye et al. "Style Transfer Through Back-Translation," arXiv:1804.09000v3 [cs.CL] May 24, 2018, https://arxiv.org/pdf/1804.09000.pdf, 13 pages.

Reddit, "Quillbot: An AI that can reword and restructure sentences," https://old.reddit.com/r/InternetIsBeautiful/comments/7y181w/quillbot_an_ai_that_can_reword_and_restructure/, accessed Sep. 25, 2020, 9 pages.

Twitter, Francis Jervis on Twitter: "GPT-3 performance on "write this like an attorney" is insane. It even includes relevant statutes if you mention a jurisdiction. This will put a lot of lawyers out of work," https://twitter.com/f_i_i_/status/1283349995144359937, accessed Sep. 25, 2020, 3 pages.

Vincent, "OpenAI's latest breakthrough is astonishingly powerful, but still fighting its flaws," The Verge, Jul. 30, 2020, https://www.theverge.com/21346343/gpt-3-explainer-openai-examples-errors-agi-potential, accessed Sep. 25, 2020, 15 pages.

* cited by examiner

MASKING PERSONAL TRAITS IN ANONYMOUS FEEDBACK

BACKGROUND

The present invention relates generally to the field of computing, and more particularly to natural language processing.

Many industries, such as business and medical contexts, rely on feedback to, among other things, evaluate performance and identify areas to target for improvement. For many of these feedback scenarios, feedback is more honest, and therefore more useful, when feedback survey respondents are assured that their feedback is anonymous.

SUMMARY

According to one exemplary embodiment, a method for masking identifying traits contained in response text is provided. Embodiments may include receiving a request to anonymize response text in response to a predefined respondent interaction, wherein the response text is generated by the respondent and then obtaining the response text, wherein the obtained response text has semantic characteristics. Next, the obtained response text may be input into a natural language processing (NLP) algorithm and thereafter receiving an alternative masking text as output from the NLP algorithm, wherein the received alternative masking text maintains the semantic characteristics of the obtained response text. Finally, the response text may be replaced with the received alternative masking text. A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As described previously, such as business and medical contexts, rely on feedback to, among other things, evaluate performance and identify areas to target for improvement. For many of these feedback scenarios, feedback is more honest, and therefore more useful, when feedback survey respondents are assured that their feedback is anonymous. Merely removing a respondent's name or other express identifier from feedback is not necessarily sufficient. More subtle ways of identifying a respondent can remain in respondent feedback, thereby negating the benefits of anonymous feedback.

Feedback surveys often incorporate a variety of input types. Some of these types, such as marking a "yes" or "no" response to question, questions with more numerous predefined multiple-choice answers, or numerical scales may allow anonymity. The questions such predefined answers may satisfy often fail to provide sufficient information for the organization soliciting the feedback and limits the questions that may be asked. As such, feedback surveys often ask open-ended questions that are not amenable to predefined answers, and therefore provide free-form text entry for answering those questions. However, ensuring anonymity in the case of free-form plain text entry responses is not a simple task. It is difficult to remove identifiers that may be hidden in the text a respondent composes when generating feedback. Many people frequently use idioms, phrases, vocabulary, and so on that are unique to a particular respondent. These unique communication cues may appear in anonymous feedback and may allow persons reviewing the feedback to identify the respondent even when express identifiers (e.g., respondent's name) are removed from the feedback.

For example, a management chain with ten to twenty people may be asked to provide feedback to their management team. A first-line manager that is familiar with the writing style of their employees, when viewing anonymous feedback in plain text may have a good chance of detecting which anonymous feedback response came from which respondent employee.

Therefore, it may be advantageous to, among other things, provide an automated way to mask personal traits or cues left in feedback. It may be further advantageous to provide a system to mask personal traits in feedback that does not rely on historical data of one or more respondents, thereby providing effective masking immediately and at scale.

The following described exemplary embodiments provide a system, method and program product for masking personal traits in feedback. As such, the present embodiment has the capacity to improve the technical field of natural language processing by automatically generating alternative feedback text that masks respondent traits. More specifically, survey feedback may be entered by a respondent (i.e., user) who then elects to have the masking alternative feedback text generated. Thereafter, the respondent's feedback may be entered into one or more natural language processing (NLP) algorithms to generate one or more alternative feedback texts that preserve the respondent's original sentiment (i.e., semantics) while masking the respondent's personal traits. The alternative texts that were generated may then be presented to the respondent. The respondent may review a portion or the complete alternative feedback texts and then select one alternative to use in place of the respondent's original feedback entry. The alternative text may then replace the respondent's original entry and the feedback submitted with the alternative text which masks the respondent's personal traits.

Figure 1:
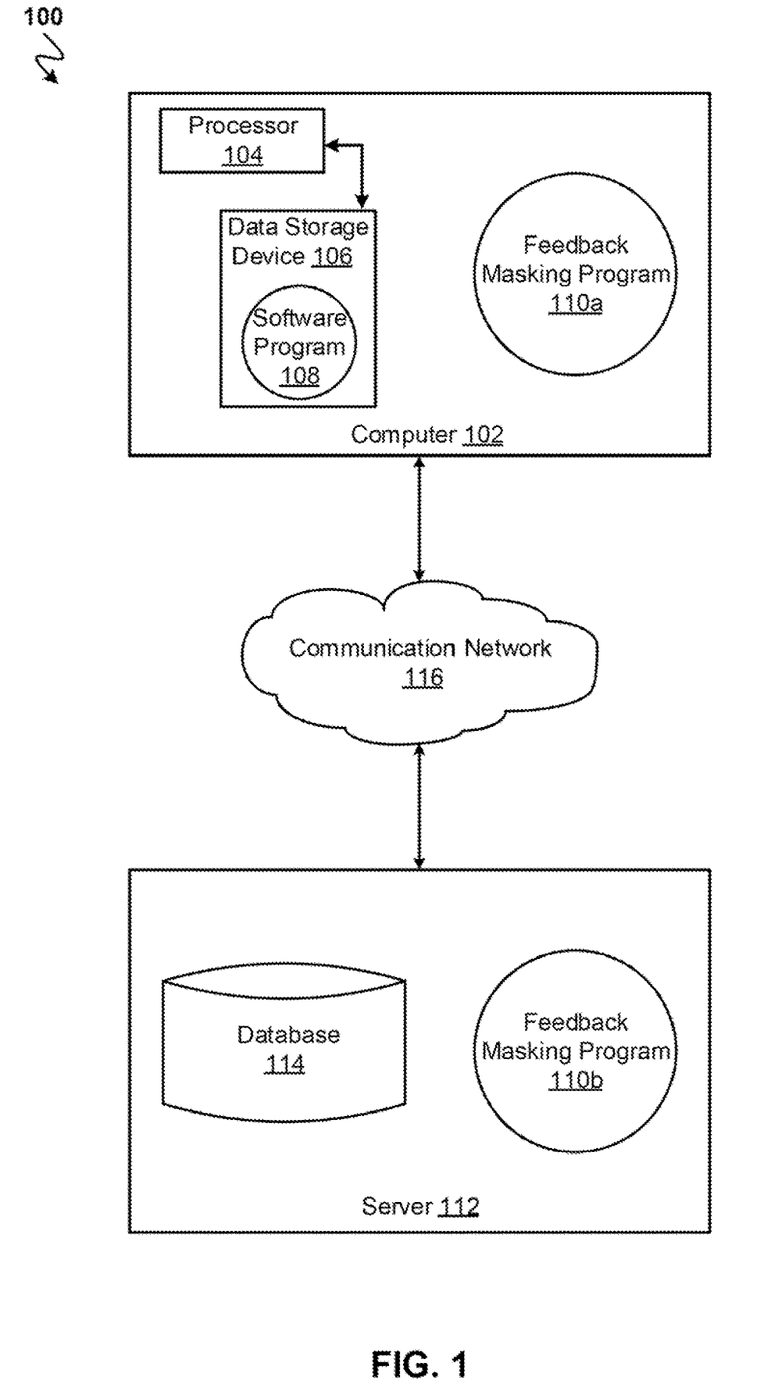
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a feedback masking program 110a. The networked computer environment 100 may also include a server 112 that is enabled to run a feedback masking program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the feedback masking program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the feedback masking program 110a, 110b (respectively) to provide feedback survey respondents with alternative response text that is semantically similar to the respondent's feedback while masking the respondent's personal traits; thereby anonymizing the feedback text submitted in response to the feedback survey. The feedback masking method is explained in more detail below with respect to FIG. 2.

Figure 2:
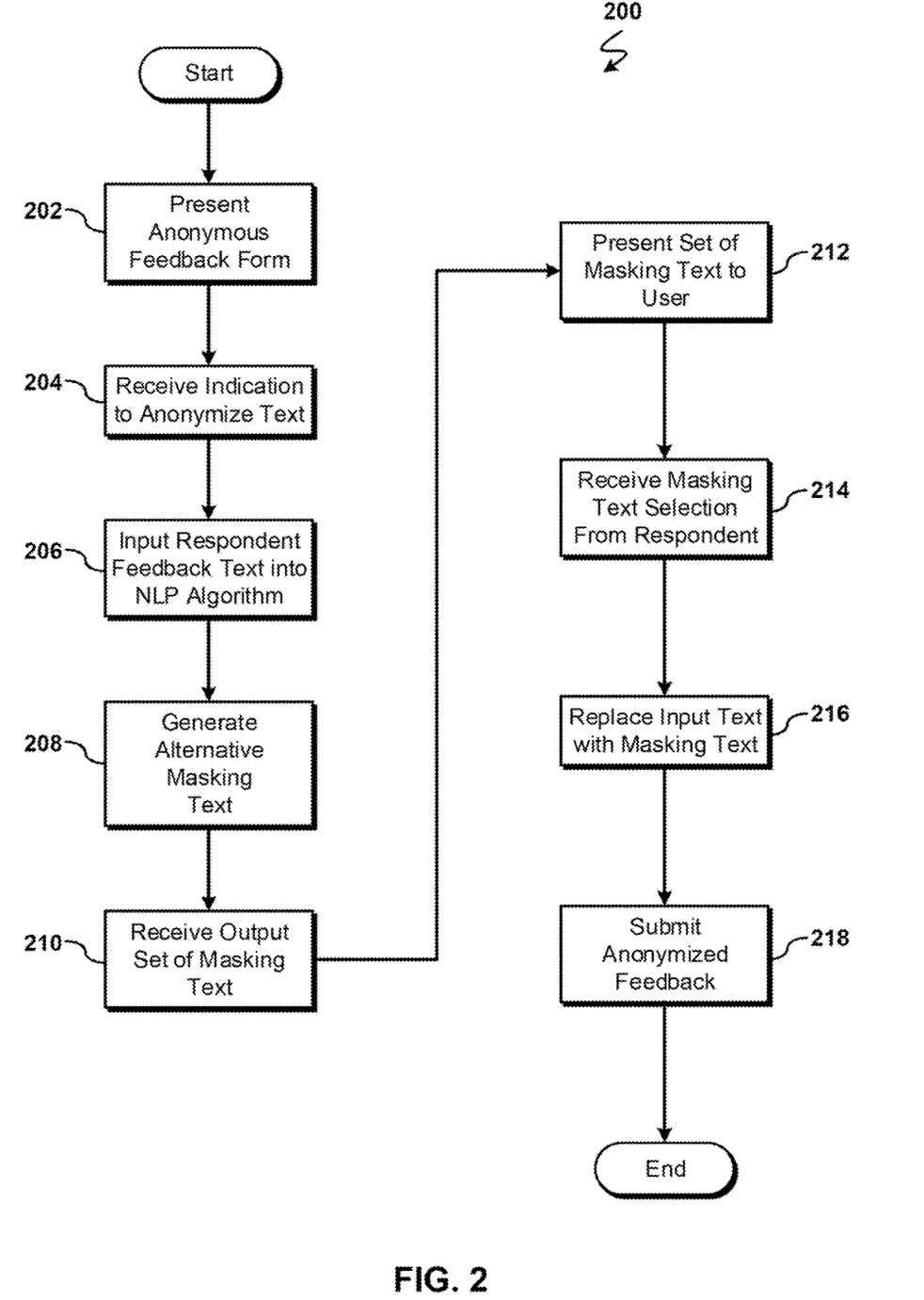
FIG. 2 is an operational flowchart illustrating a process for feedback masking according to at least one embodiment.

Referring now to FIG. 2, an operational flowchart illustrating the exemplary feedback masking process 200 used by the feedback masking program 110a and 110b according to at least one embodiment is depicted.

At 202 a feedback form requesting anonymous feedback is presented to the respondent (i.e., user). The feedback form may be formatted and presented based on the specific feedback survey implementation. For example, anonymous feedback may be used within organizations, large or small, to evaluate employee satisfaction and solicit areas to improve. Anonymous feedback may be used in numerous other situations, such as customer reviews of products and services, subjects feedback in response to medical tests, and so on. According to embodiments, the survey feedback form soliciting anonymous feedback may be presented as an electronic text entry form displayed on a screen of a computer 102. The feedback form may include a text entry field for responding to one or more questions presented to the respondent. For example, the anonymous feedback form may present a question to a respondent employee asking them to describe aspects that an organization could improve in a text box beneath the question.

Next, at 204, an indication is received to anonymize text entered by the respondent. According to at least one embodiment, the feedback masking program 110a and 110b may be implemented as a feature within a feedback survey and provide a way for the respondent to indicate their desire to have feedback entry text anonymized. For example, a button may be added to the user interface of the survey marked by an appropriate text label (e.g., "Anonymize Text") or icon that may be pressed to indicate the respondent wants the entry text to be anonymized. In other implementations, the respondent may provide an indicia to anonymize text based on, for example, a predefined voice command received from a microphone connected to a computer 102, or via a predefined gesture captured by a touchpad or camera connected to a computer 102 the respondent is using.

According to other embodiments, the feedback masking program 110a and 110b may be implemented as an anonymizing browser plug-in for use in conjunction with web-based survey entry forms. As a browser plug-in, the respondent may provide an indicia to anonymize text by, for example, clicking a user interface button displayed by the browser plug-in when the respondent is on a page that displays feedback text entry fields or by clicking on a button in the browser user interface corresponding to the browser plug-in. It may be appreciated that the feedback masking program 110a and 110b may be implemented in other ways to allow a respondent to indicate they want to anonymize a text entry.

Then, at 206, the respondent feedback text is input into a natural language processing (NLP) algorithm for processing to anonymize the feedback text. According to at least one embodiment, after the respondent interacts with a button, speaks a predefined verbal command, or the like at 204, the current text entered into a text field may be copied (e.g., via an application programming interface (API) call) and then input into an NLP algorithm for processing.

A variety of NLP algorithms may be used to anonymize text without requiring prior historical data of one or more respondents. According to some embodiments, an autoregressive language model may be utilized. For example, the Generative Pre-trained Transformer 3 (GPT-3) algorithm may be used to produce natural language text conforming to certain target styles while maintaining the input text's semantics. For instance, the GTP-3 algorithm may take input text and process the text to produce text that conforms to a generic style such as a manager or a lawyer, or a more specific style mimicking a particular person, such as Abraham Lincoln. As such, the GPT-3 algorithm may take input text and a selected target style that are then processed using machine learning to produce output text matching the target style. The output text generated by the GPT-3 or equivalent algorithm will have the same or similar semantics of the input text while being expressed in a style that evokes the target style.

The GPT-3's target style may be set by the user through a user preference or, according to some embodiments, at the time the user indicates they want their text anonymized. According to other embodiments, the survey administrator (i.e., the entity seeking feedback, such as a human resources department) may specify a default target style or provide a predefined suite of target style options. Thus, depending on the implementation, the feedback masking program 110a and 110b may present through a user interface a selection of different target styles that may be selected by the respondent, survey administrator, or other person.

According to at least one embodiment, a dialog box or other user interface feature may be generated by the feedback masking program 110a and 110b listing the available target styles that may then be presented to a user (e.g., respondent) for selection. For example, a dialog box may be presented to a respondent in response to the respondent pressing a button to anonymize their feedback text where the dialog box may list the available target styles. The target styles presented to the respondent may, for example, include "lawyer," "manager," and "Abraham Lincoln." According to some embodiments, the listed target styles may include a text description of each target style. Additionally, or alternatively, a general sample of text corresponding with each style expressing the same semantics (or semantic characteristics) in each of the different target styles may also be presented in the dialog box. For instance an exemplary generic feedback expressing a lack of career growth opportunities may be expressed in each of the available target styles and be displayed along side the target style choice in order to better inform the respondent what the target style will likely produce as anonymized text. After presenting the choices to a user, the user may select one or more target styles to anonymize the feedback text.

As discussed above, in some embodiments, the respondent may have a profile or other data linked to them that stores a user preference regarding a target style. In such embodiments, the user may not be presented with a choice of one more target styles in response to triggering text anonymization. Instead, the user may be presented with choices when setting up or modifying their user preference and the feedback masking program 110a and 110b may automatically use the user's preference to select one or more target styles that will be used by the NLP algorithm.

In other embodiments, and as described above, a survey administrator may predefine one or more available target styles. In embodiments that use survey administrators to select available target styles, the user may not be presented with a choice of one or more target styles in response to triggering text anonymization. Instead, the survey administrator may be presented with choices when setting up or modifying their predefined target styles and the feedback masking program 110a and 110b may automatically use the survey administrator's predefined target styles to select one or more target styles that will be used by the NLP algorithm or limit the available styles presented to a user in accordance with the predefined suite of target styles specified by the survey administrator.

According to other embodiments, the respondent text may be translated to another language (e.g., from English to French) and then back to the original language (e.g., French back to English) to produce semantically consistent text that removes the respondent's traits during the language conversion process. In embodiments using such algorithms, the user or survey administrator may not be presented with the option to choose a target style since a target style may not be an input parameter for the algorithm.

At 208, alternative masking text is generated according to the NLP algorithm. Depending on implementation, one or more target styles may have been chosen by the respondent or the survey administrator. If only one target style was selected, the NLP algorithm will produce one alternative masking text representing the entire input text feedback entry in the target style. If more than one target style was selected, the NLP algorithm may be run multiple times to produce an alternative masking text representing the entire input text feedback entry for each target style selected.

For example, if three different target styles $S_1$ "manager", $S_2$ "lawyer", and $S_3$ "Abraham Lincoln" are selected, the NLP algorithm will be executed three times using the input text. Thus, the first time the NLP algorithm is run, the NLP algorithm will take as input the input text I and style $S_1$ and produce alternative text $A_1$ which maintains the semantics of I expressed in the style of $S_1$ (i.e., the text will mimic text expressing the same semantics written by a manager). Subsequently, the NLP algorithm is run a second time, the NLP algorithm will take as input the input text I and style $S_2$ and produce alternative text $A_2$ which maintains the semantics of I expressed in the style of $S_2$. Finally, the NLP algorithm is run a third time taking as input the input text I and style $S_3$ and produce alternative text $A_3$ which maintains the semantics of I expressed in the style of $S_3$. As such, a set of three alternative masking texts $A_1$-$A_3$ will be generated.

Then, at 210, the output alternative set of masking text is received. After the NLP algorithm generates one or more alternative masking texts (i.e., the output set of alternative masking texts), the set of alternative masking texts is received by the feedback masking program 110a and 110b. Continuing the previous example, the feedback masking program 110a and 110b receives alternative masking texts $A_1$-$A_3$.

Next, at 212, the received set of masking texts are presented to the respondent. According to at least one embodiment, the feedback masking program 110a and 110b may generate and present, for example via the user interface, the set of masking texts for the respondent to review. In some embodiments, portions of the resulting alternative text in each style may be displayed within the user interface. The respondent may then interact with the text portions displayed (e.g., mouse click) that will result in the feedback masking program 110a and 110b displaying the whole masking text (e.g., masking text $A_1$) for the respondent to review. In other embodiments, the feedback masking program 110a and 110b may present a button or other user interface feature for that the respondent may interact with in order to view the entire masking text.

According to at least one alternative embodiment, the feedback masking program 110a and 110b may present the complete masking texts to the respondent. In some embodiments, the feedback masking program 110a and 110b may display a portion or the entire masking text to the user based on the limitations of the computer 102 or device the respondent is using the feedback masking program 110a and 110b (e.g., screen size). In other words, the feedback masking program 110a and 110b may display the entire masking text on devices that can simultaneously display all of the masking texts due to sufficient screen size or if the masking text lengths are sufficiently short, and so on. The same feedback masking program 110a and 110b may only display portions of the masking text due to the limitations of a different device based on the length of masking texts, and so on. The feedback masking program 110a and 110b may determine the limitations of the of the device the respondent is using by making queries to determine screen size, resolution, window size, and so forth which may be compared with the length of the masking texts.

Next, at 214, a masking text selection made by the respondent is received. In embodiments, after the set of masking texts are presented to the user, a user interface feature (e.g., a button) may be clicked by the respondent to indicate which masking the text the respondent wants to use as an alternative to the feedback text the respondent originally entered (i.e., respondent assent). In other embodiments, the respondent may select a masking text to use via voice command, gestures, and the like. For example, if alternative masking texts $A_1$-$A_3$ were presented and the respondent chose $A_2$, then the feedback masking program 110a and 110b will receive notification that the respondent selected masking text $A_2$.

Then, at 216, the original input text is replaced by the selected masking text. According to at least one embodiment, once the respondent's choice of masking text is known, the original input text may be removed and discarded from the feedback entry field. Thereafter, the respondent-selected masking text may be automatically inserted into the feedback entry field. Continuing the previous example, the respondent's original feedback text entry is replaced by alternative masking text $A_2$ in response to the respondent's selection. In embodiments, the masking text may be editable, allowing the respondent to further alter the text as the respondent sees fit.

At 218, the feedback survey is completed and submitted. The respondent may continue to answer the survey, answering additional questions and utilizing the feedback masking program 110a and 110b to generate anonymized masking text as needed, until the survey is completed and the respondent submits the feedback form.

It may be appreciated that FIG. 2 provides only an illustration of one embodiment and does not imply any limitations with regard to how different embodiments may be implemented. Many modifications to the depicted embodiment(s) may be made based on design and implementation requirements.

For example, in some alternative embodiments, alternative text may be generated in real-time as the respondent types in their feedback text based on a user preference target style or predefined survey administrator style. Thus, portions of complete feedback text may be input into the NLP algorithm and processed using a predefined target style. Thereafter, the masking text returned by the NLP algorithm may be inserted in place of the original text portion. For instance, when each sentence is completed by the respondent, the sentence may automatically be processed by the NLP algorithm and the output text inserted in place of the original sentence along with an visual indication that the text was just changed (e.g., with a colored underline, different colored or style font, and so on).

As described in the embodiments above, the feedback masking program 110a and 110b may improve the functionality of a computer or other technology by providing an integrated way to anonymize text entry in electronic feedback forms by removing potentially identifiable characteristics in a respondent's feedback text entry. Moreover, the embodiments described provide a way to anonymize feedback entry text in a manner that does not rely on collecting historical data about individuals to specifically identify and mask words or phrases a particular respondent uses that may uniquely identify them. Instead, the disclosed embodiments forego the resources used to build and store such historical data, which would be voluminous beyond a handful of respondents, by utilizing one or more algorithms that may universally mask personal traits while maintaining semantics (i.e., semantic characteristics). Additionally, the disclosed embodiments do not require time to collect data in order to learn the traits of respondents to improve in accuracy and instead the disclosed embodiments are immediately effective and may be used effectively at scale immediately.

Figure 3:
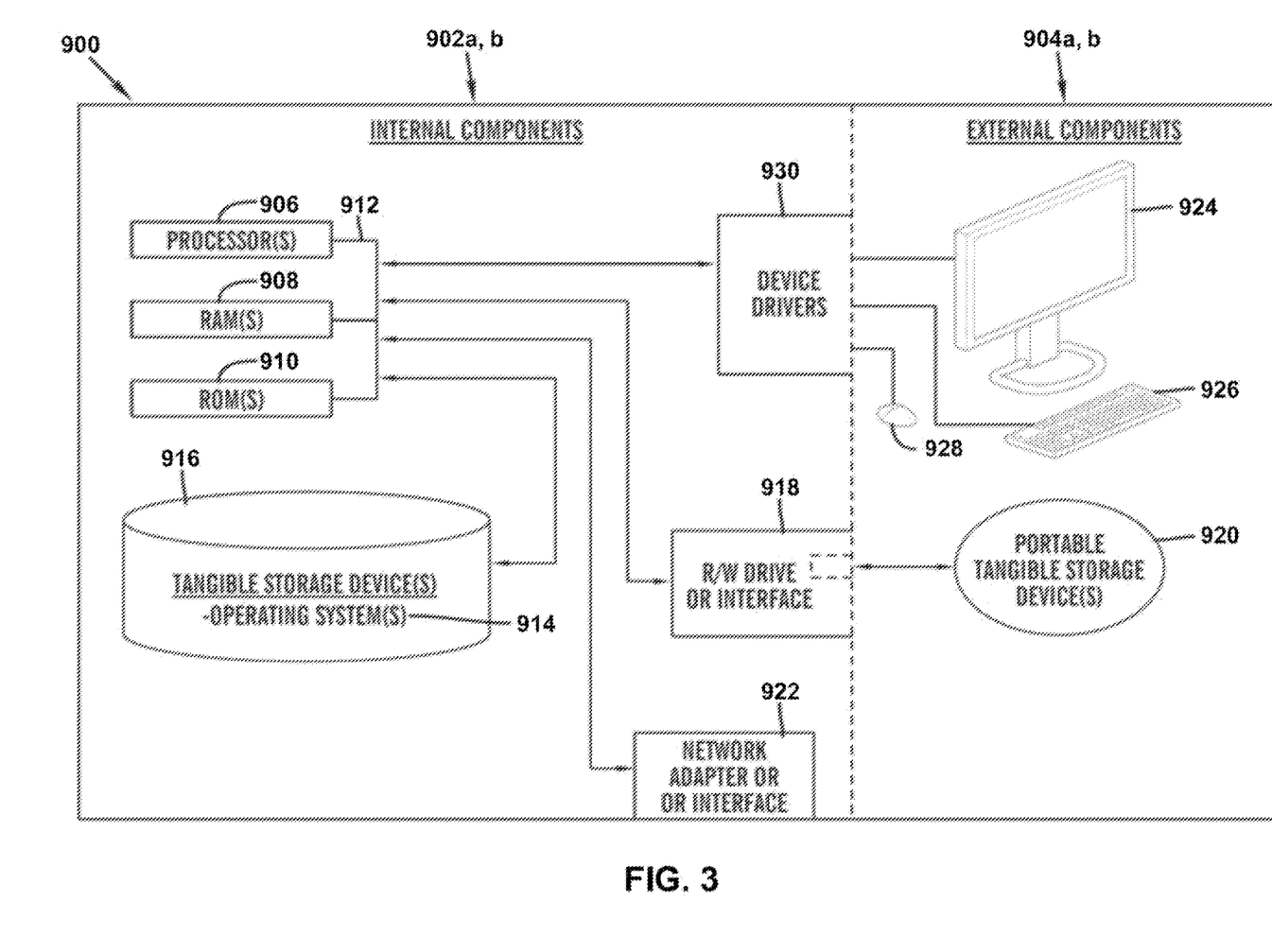
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the feedback masking program 110a in client computer 102, and the feedback masking program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the feedback masking program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the feedback masking program 110a in client computer 102 and the feedback masking program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the feedback masking program 110a in client computer 102 and the feedback masking program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
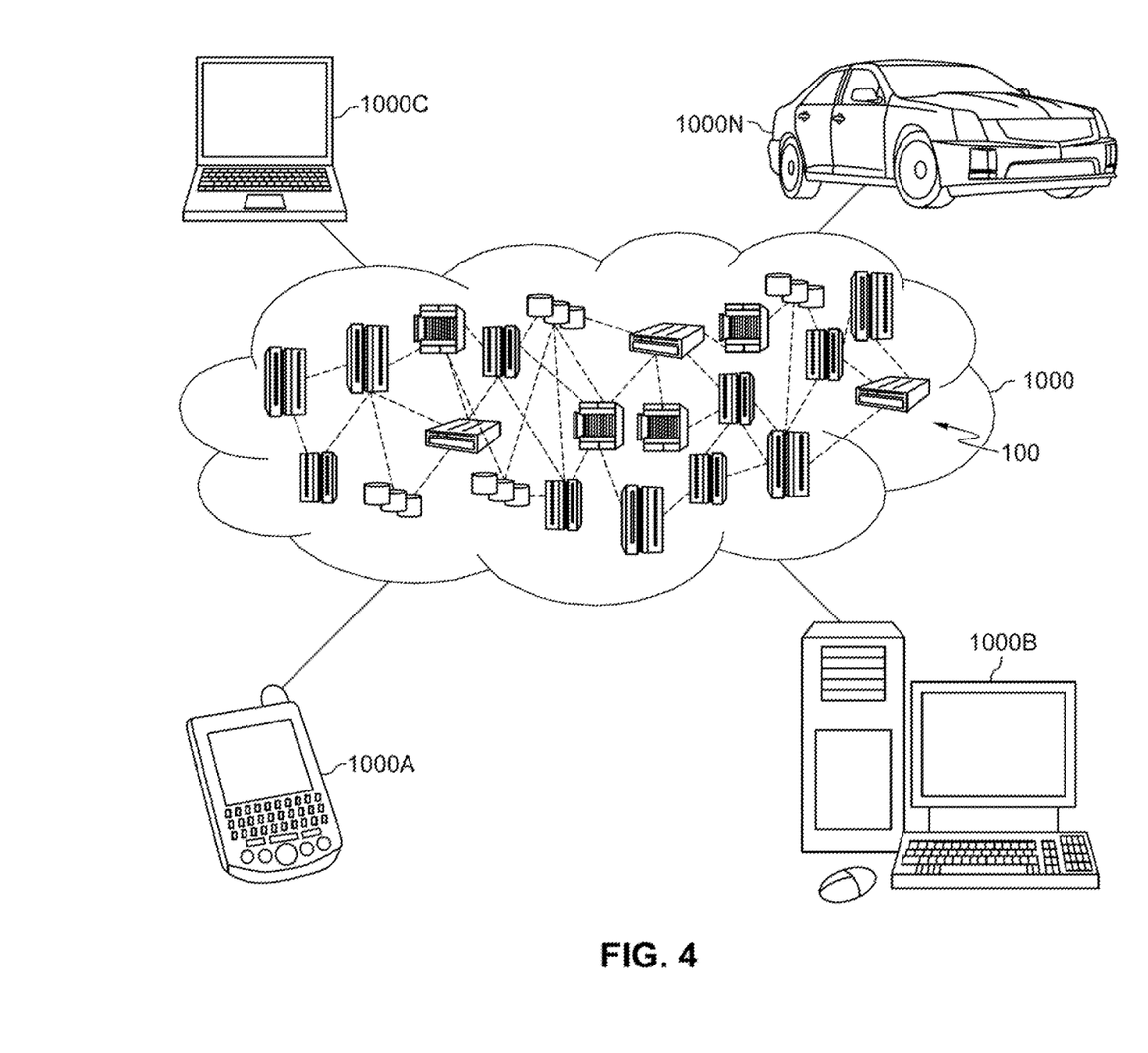
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
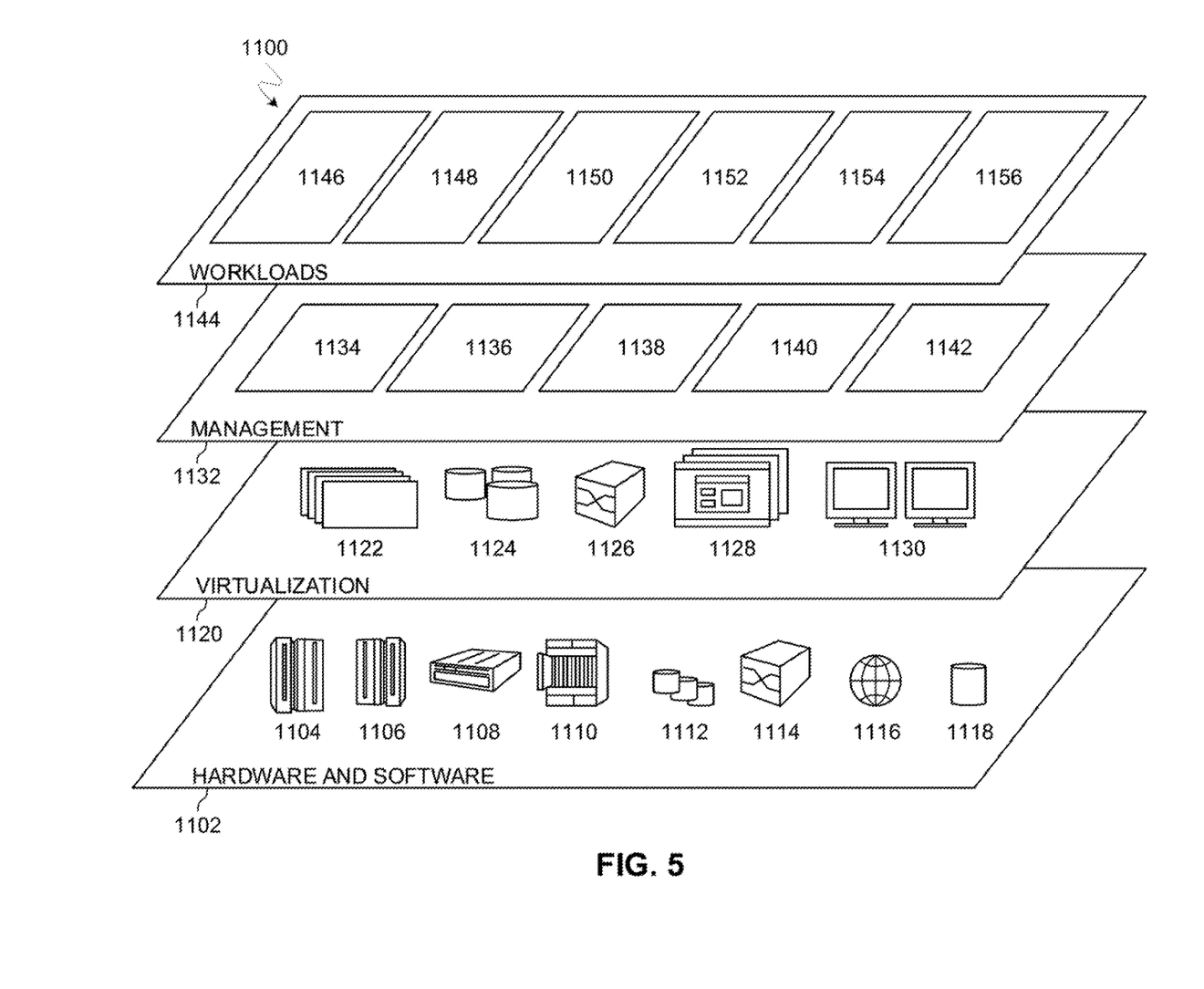
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and feedback masking 1156. A feedback masking program 110a, 110b provides a way to automatically generate semantically similar alternative text to the text a respondent enters in response to a feedback survey, thereby masking the personal traits that would otherwise be present the respondent's survey response.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for masking identifying traits contained in response text, the method comprising:
   receiving a request to anonymize a response text in response to a predefined respondent interaction, wherein the response text is generated by the respondent;
   obtaining the response text, wherein the obtained response text has semantic characteristics;
   inputting the obtained response text into a natural language processing (NLP) algorithm, wherein the NLP algorithm is objective and not subjective to historical data of the respondent;
   receiving an alternative masking text as output from the NLP algorithm, wherein the received alternative masking text maintains the semantic characteristics of the obtained response text; and
   replacing the response text with the received alternative masking text.

2. The computer-implemented method of claim 1, further comprising:
   displaying the received alternative masking text to the respondent; and
   wherein the replacing the response text with the received alternative masking text occurs in response to receiving respondent assent to use the received alternative masking text.

3. The computer-implemented method of claim 1, further comprising:
   displaying a portion of the received alternative masking text to the respondent;
   responsive to a second predefined respondent interaction, displaying the received alternative masking text in whole; and
   wherein the replacing the response text with the received alternative masking text occurs in response to receiving respondent assent to use the received alternative masking text.

4. The computer-implemented method of claim 1, further comprising:
   receiving a target style; and
   wherein the inputting the obtained survey response text into the NLP algorithm further comprises inputting the received target style into the NLP algorithm, and wherein the received alternative masking text output from the NLP algorithm incorporates the received target style.

5. The computer-implemented method of claim 4, wherein receiving the target style comprises retrieving and utilizing a predefined user-preference associated with the respondent that indicates one or more target style choices.

6. The computer-implemented method of claim 4, wherein receiving the target style comprises presenting the respondent with a plurality of target style choices.

7. The computer-implemented method of claim 6, wherein presenting the respondent with the plurality of target style choices comprises displaying names of the plurality of target style choices together with corresponding text samples of each target style.

8. A computer system for masking identifying traits contained in response text, comprising:
 one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
 receiving a request to anonymize a response text in response to a predefined respondent interaction, wherein the response text is generated by the respondent;
 obtaining the response text, wherein the obtained response text has semantic characteristics;
 inputting the obtained response text into a natural language processing (NLP) algorithm, wherein the NLP algorithm is objective and not subjective to historical data of the respondent;
 receiving an alternative masking text as output from the NLP algorithm, wherein the received alternative masking text maintains the semantic characteristics of the obtained response text; and
 replacing the response text with the received alternative masking text.

9. The computer system of claim 8, further comprising:
 displaying the received alternative masking text to the respondent; and
 wherein the replacing the response text with the received alternative masking text occurs in response to receiving respondent assent to use the received alternative masking text.

10. The computer system of claim 8, further comprising:
 displaying a portion of the received alternative masking text to the respondent;
 responsive to a second predefined respondent interaction, displaying the received alternative masking text in whole; and
 wherein the replacing the response text with the received alternative masking text occurs in response to receiving respondent assent to use the received alternative masking text.

11. The computer system of claim 8, further comprising:
 receiving a target style; and
 wherein the inputting the obtained survey response text into the NLP algorithm further comprises inputting the received target style into the NLP algorithm, and wherein the received alternative masking text output from the NLP algorithm incorporates the received target style.

12. The computer system of claim 11, wherein receiving the target style comprises retrieving and utilizing a predefined user-preference associated with the respondent that indicates one or more target style choices.

13. The computer system of claim 11, wherein receiving the target style comprises presenting the respondent with a plurality of target style choices.

14. The computer system of claim 13, wherein presenting the respondent with the plurality of target style choices comprises displaying names of the plurality of target style choices together with corresponding text samples of each target style.

15. A computer program product for masking identifying traits contained in response text, comprising a computer-readable storage medium having program instructions embodied therewith, the program instructions executable by a processor, to cause the processor to perform a method comprising:
 receiving a request to anonymize a response text in response to a predefined respondent interaction, wherein the response text is generated by the respondent;
 obtaining the response text, wherein the obtained response text has semantic characteristics;
 inputting the obtained response text into a natural language processing (NLP) algorithm, wherein the NLP algorithm is objective and not subjective to historical data of the respondent;
 receiving an alternative masking text as output from the NLP algorithm, wherein the received alternative masking text maintains the semantic characteristics of the obtained response text; and
 replacing the response text with the received alternative masking text.

16. The computer program product of claim 15, further comprising:
 displaying the received alternative masking text to the respondent; and
 wherein the replacing the response text with the received alternative masking text occurs in response to receiving respondent assent to use the received alternative masking text.

17. The computer program product of claim 15, further comprising:
 displaying a portion of the received alternative masking text to the respondent;
 responsive to a second predefined respondent interaction, displaying the received alternative masking text in whole; and
 wherein the replacing the response text with the received alternative masking text occurs in response to receiving respondent assent to use the received alternative masking text.

18. The computer program product of claim 15, further comprising:
 receiving a target style; and
 wherein the inputting the obtained survey response text into the NLP algorithm further comprises inputting the received target style into the NLP algorithm, and wherein the received alternative masking text output from the NLP algorithm incorporates the received target style.

19. The computer program product of claim 18, wherein receiving the target style comprises retrieving and utilizing a predefined user-preference associated with the respondent that indicates one or more target style choices.

20. The computer program product of claim 18, wherein receiving the target style comprises presenting the respondent with a plurality of target style choices.

\* \* \* \* \*